United States Patent [19]

Feldmeier et al.

[11] Patent Number: 4,572,525
[45] Date of Patent: Feb. 25, 1986

[54] CENTRIFUGAL CHUCKING APPARATUS

[75] Inventors: Fritz Feldmeier; Gregor Hafner, both of Nuremberg, Fed. Rep. of Germany

[73] Assignee: Georg Muller Kugellager-Fabrik K.G., Fed. Rep. of Germany

[21] Appl. No.: 957,064

[22] Filed: Nov. 3, 1978

[30] Foreign Application Priority Data

Nov. 3, 1977 [DE] Fed. Rep. of Germany ....... 2749115

[51] Int. Cl.$^4$ ............................................. B23B 31/14
[52] U.S. Cl. ....................................... 279/1 C; 279/29; 279/33; 279/35
[58] Field of Search ..................... 279/1 C, 1 SG, 1 L, 279/1 S, 1 G, 9 R, 19.1, 19.4, 28, 33, 35, 106, 109, 118, 119, 29

[56] References Cited

U.S. PATENT DOCUMENTS

| | | | |
|---|---|---|---|
| 2,785,904 | 3/1957 | Garrison et al. | 279/1 C |
| 2,857,167 | 10/1958 | Smith | 279/1 C |
| 3,553,753 | 1/1971 | Hundley | 279/16 |
| 4,047,723 | 9/1977 | Buck | 279/1 C |

FOREIGN PATENT DOCUMENTS 458398  3/1975  U.S.S.R. ............... 279/1 C

*Primary Examiner*—Gil Weidenfeld
*Assistant Examiner*—Daniel W. Howell
*Attorney, Agent, or Firm*—Steinberg & Raskin

[57] ABSTRACT

Centrifugal chucking apparatus for fixing a member to be rotated to a rotatable driving member includes a cylindrical cage member adapted to be mounted for rotation with the driving member, at least one clamping body movably mounted within an aperture formed in the cage member and which moves into engagement with the member to be rotated during rotation of the driving member under the action of centrifugal force, and at least one lever member associated with the clamping body and mounted for rotation with the driving and cage members. The lever member mutually engages both the clamping body and the cage member and during rotation of the driving member the lever member is urged outwardly under the action of centrifugal force. The lever member is appropriately positioned so that as a result of this outward urging under centrifugal force, the lever member exerts a force against the clamping body which has a direction to increase the force with which the clamping body engages the member to be rotated. Further, the clamping body is positively braced in engagement with the member to be rotated by the lever member which forms a rigid link interconnecting the cage member and clamping body. This additional bracing prevents any reduction in the clamping force exerted by the clamping body on the member to be rotated which might otherwise result from vibrations or other disturbances which occur during a particular application of the apparatus, e.g., where the member to be rotated is a workpiece which is being treated.

10 Claims, 5 Drawing Figures

CENTRIFUGAL CHUCKING APPARATUS

BACKGROUND OF THE INVENTION

This invention relates generally to chucking apparatus for fixing a member to be rotated to a rotatable driving member and, more particularly, to such chucking apparatus which utilizes centrifugal force in connection with such fixation.

Chucking apparatus of the type wherein members having cylindrical shafts or bores are fixed for rotation with driving members by clamping devices which are guided in a cage member under the action of centrifugal force are known For example, see the chucking apparatus illustrated in the publication Konstruktion 29 (1977), Issue 2, Page 59, Picture 10 of March 24, 1977.

In conventional centrifugal chucking apparatus, the member to be rotated, which may comprise a tool or workpiece, has a cylindrical shaft or bore and is fixed for rotation with a driving member, which may comprise an outer hollow cylindrical member or an inner solid shaft or mandrel by clamping bodies associated with the driving member which engage the rotated member under the action of centrifugal force resulting from the rotation of the driving member. Thus, in the case where the rotated member has a cylindrical shaft, the driving member usually comprises a hollow cylindrical member in whose bore the rotated member is located for engagement by the clamping bodies which move inwardly under centrifugal force to engage the outer surface of the rotated member. Similarly, in the case where the rotated member has a hollow bore, the driving member is usually a mandrel which is located within the bore so that the clamping bodies move outwardly under centrifugal force to engage the inner surface of the rotated member.

However, such prior art centrifugal chucking apparatus are not entirely satisfactory for several reasons. Thus, generally, in such conventional chucking apparatus, the clamping bodies are usually pre-stressed so that they engage the rotated member even absent rotation of the driving member. Thus, removal of the rotated member from the driving member, such as when the tool or workpiece is changed, the clamping bodies frictionally engage the surface of the rotated member to be chucked thereby causing deleterious wear and deterioration of the surface of the clamping body which normally engages the rotated member.

Additionally, it has been found that during rotational acceleration of the driving member and associated rotated member, the engaging force exerted by the centrifugally operated clamping bodies on the rotated member tends to diminish. This appears to be a result of the tendency of the clamping bodies to rise or lift-off from their desired clamping locations. This diminished clamping force often results in slippage of the rotated member with respect to the driving member. Similar problems are also encountered in the operation of conventional centrifugal chucking apparatus when subjected to vibrations during operation. Thus, when the rotated member comprises a workpiece, the vibrations set up therein worked upon by a tool often causes a reduction in the clamping force exerted by the clamping bodies on the workpiece. These effects also appear in the case where the rotated member comprises a tool.

Centrifugal chucking apparatus have been proposed wherein the clamping bodies have been designed so that their centers of gravity are located outside of the axis of rotation in a manner such that during rotation, the clamping bodies are subjected to a tilting movement or torque which is intended to supplement the usual clamping force. However, even supplemented by the above provisions, in view of the unfavorable lever ratios present in such apparatus, the clamping force is still found to be inadequate to overcome the problems described above including the slippage which occurs during, for example, a machining process.

SUMMARY OF THE INVENTION

Accordingly, one object of the present invention is to provide new and improved centrifugal chucking apparatus.

Another object of the present invention is to provide new and improved centrifugal chucking apparatus wherein the clamping bodies are free to rotate, i.e. are not pre-stressed.

Still another object of the present invention is to provide a new and improved centrifugal chucking apparatus wherein the force with which the clamping bodies engage the rotated member is sufficiently high so as to prevent slippage of the rotated member with respect to the driving member.

Yet another object of the present invention is to provide a new and improved centrifugal chucking apparatus wherein the force with which the clamping bodies engage the rotated member does not diminish during operation of the apparatus.

A still further object of the present invention is to provide a new and improved centrifugal chucking apparatus wherein slippage between the driving and rotated members is prevented even during vibrational loading of the rotated member.

Briefly, in accordance with the present invention, these and other objects are attained by providing chucking apparatus including a cage member adapted to be mounted for rotation with the driving member and at least one clamping body movably mounted within an aperture formed in the cage and which has a bearing surface adapted to move into engagement with the surface of the rotated member under the action of centrifugal force during rotation. The clamping bodies are mounted without pre-stressing. A lever member is mounted for rotation with the cage and driving members having a leg which at one end engages the clamping body and at its other end engages the cage member. During rotation, the centrifugal force acting on the lever has a component transmitted to the point of contact between the lever leg and the clamping body, which component comprises a pushing force directed in a manner which tends to supplement and reinforce the clamping engagement between the clamping body and the rotated member. Additionally, the clamping body is positively braced in its engaging configuration by the lever leg which, by virtue of its engagement with the cage, prevents slippage of the rotated member during rotation.

DESCRIPTION OF THE DRAWINGS

A more complete appreciation of the invention and many of its attendant advantages will be readily appreciated as the same becomes better understood by reference to the following detailed description when considered in connection with the accompanying drawings in which.

DESCRIPTION OF THE PREFERRED EMBODIMENTS

Figure 1:
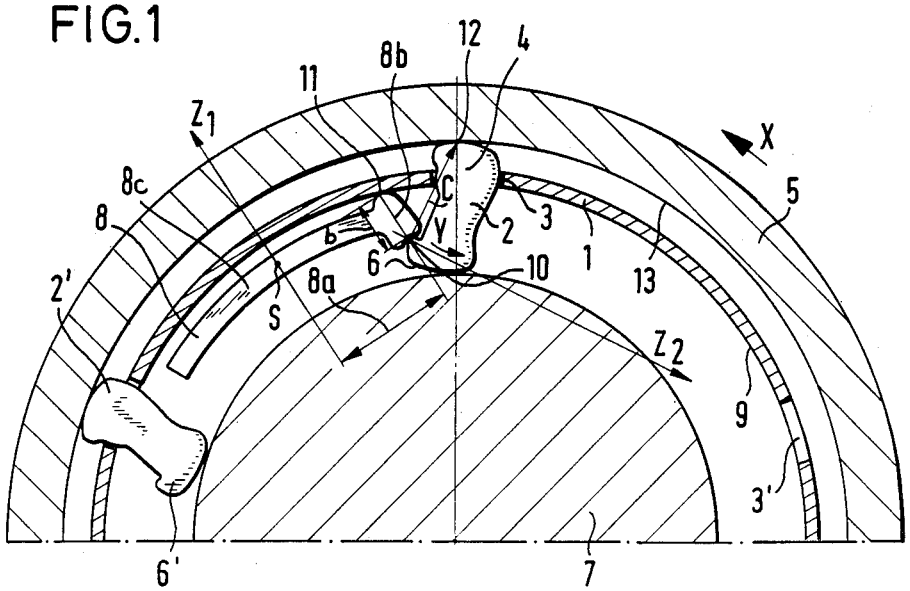
FIG. 1 is a partial transverse sectional view of one embodiment of the chucking apparatus of the present invention.
Figure 3:
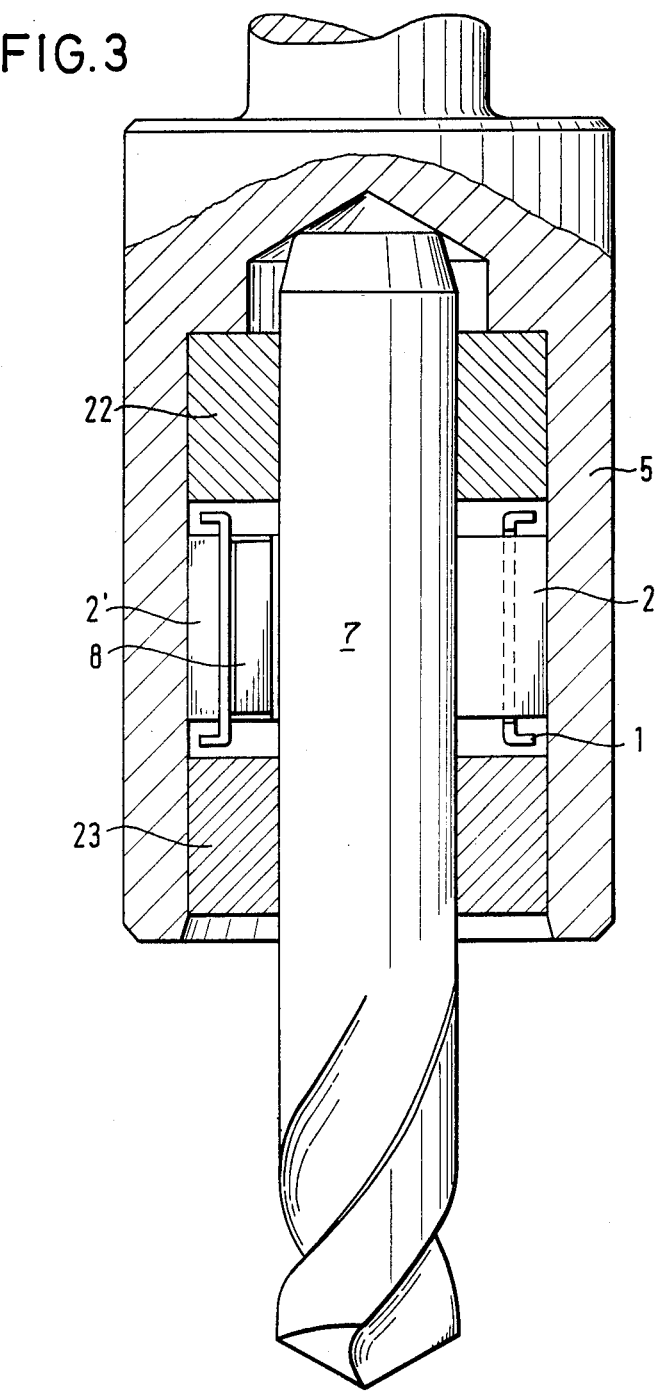
FIG. 3 is a partial longitudinal sectional view of the embodiment of the chucking apparatus illustrated in FIG. 1.

Referring now to the drawings wherein like characters designate identical or corresponding parts throughout the several views and, more particularly, to FIGS. 1 and 3, an embodiment of the chucking apparatus of the present invention is illustrated adapted for use in connection with a driving member comprising a hollow cylindrical member and a rotated member having a cylindrical shank. Thus, a rotatable hollow cylindrical driving member 5 carries a rotated member 7 which comprises in the illustrated embodiment a drill bit. Of course, it is understood that the rotated member may comprise any tool or workpiece having a cylindrical shank. The rotated member 7 is fixed to the driving member 5 by the chucking apparatus of the present invention which comprises a cylindrical cage member 1, clamping bodies 2, 2' and a lever member 8. Thus, cage member 1 is fixed at its ends to the driving member 5 for rotation therewith and clamping bodies 2, 2' are freely located and guided in spaced apertures 3, 3' formed around the circumference of cage member 1. It is understood that clamping bodies are provided in each of the apertures 3' which are shown in FIG. 1 as being void of such clamping bodies for the sake of clarity. The clamping bodies are disposed in apertures 3 in a manner such that they will freely pivot about a vertical longitudinal axis 4 under the action of centrifugal force upon driving and cage members 5, 1, being rotated. Thus, upon driving and cage members 5, 1, rotating in the direction of arrow "X", the clamping bodies 2, 2' will pivot about axis 4 in a direction indicated by arrow "Y" so that points on their bearing surfaces 6, 6' will engage the surface of rotated member 7. Such engagement, while being normally sufficient to fix rotated member 7 to driving member 5 for rotation therewith, is subject to the particular disadvantages discussed above.

A lever member 8 is provided in the space defined between cage member 1 and rotated member 7 and is defined by a lever leg 8b and curved elongate arm portion 8c. It is understood that each clamping body 2 is preferably similarly provided with an identical lever member 8. Lever leg 8b has a first end surface which lightly bears against clamping body 2 at a point 10 and a second end surface which lightly bears against the inner surface 9 of cage member 1 at an apex point 11 defined on lever leg 8b. The first end surface of lever leg 8b is formed having an indentation in which a corresponding protrusion formed on clamping body 2 is located, the point of contact 10 between the lever leg 8b and clamping body 2 comprising the fulcrum of lever member 8. Thus, lever member 8 is rotatably positioned, in toggle-joint fashion, with respect to clamping body 2 around the fulcrum point 10. Apex point 11 of lever leg 8b slidably engages the inner surface 9 of cage member 1.

Upon rotation of the apparatus shown in FIG. 1 in the direction of arrow X, the lever member 8 is subjected to an outwardly radially directed centrifugal force, designated $Z_1$, which acts through the center of gravity S of the lever member 8 which is located on the elongate lever arm portion 8c. The centrifugal force $Z_1$ produces a moment or torque about the fulcrum point 10 which results in an opposing pushing force $Z_2$ which produces an equal and oppositely directed moment about fulcrum 11. The magnitude of pushing force $Z_2$ is determined by the length of lever arms 8a and b and C, the latter of which is the distance between fulcrum point 10 and a point 12 on the outer surface of clamping body 2 which abuts against the inner wall 13 of driving member 5. Pushing force $Z_2$ is directed along a line normal to the abutting surfaces of lever leg 8b and clamping body 2 and tends to further urge clamping body 2 in the direction indicated by arrow Y so as to increase the force with which clamping body 2 engages rotated member 7.

Referring to FIG. 3, the chucking apparatus of the present invention comprising cage member 1, clamping bodies 2,2' and lever member 8 are preferably located between a pair of bushings 22,23 located within driving member 5, which bushings function as guides for rotated member 7.

Thus, it is seen that by providing lever member 8 as shown in FIGS. 1 and 3, the force with which clamping body 2 engages rotated member 7 is increased without the necessity of providing means for pre-stressing. Furthermore, since the lever leg 8b is in initial engagement with the inner surface 9 of cage member 1 and clamping body 2, the latter is positively braced in position so that slippage cannot occur. It is possible within the scope of the invention to provide several or all of the clamping bodies with centrifugal weight levers as described above depending upon the extent to which it is desired to increase the engagement forces exerted by the clamping bodies on the rotated member. The magnitude of the pushing force $Z_2$ exerted on clamping bodies 2 by lever members 8 may also be varied by suitably varying the weight of lever member 8 and/or by altering the dimensions thereof.

Figure 2:
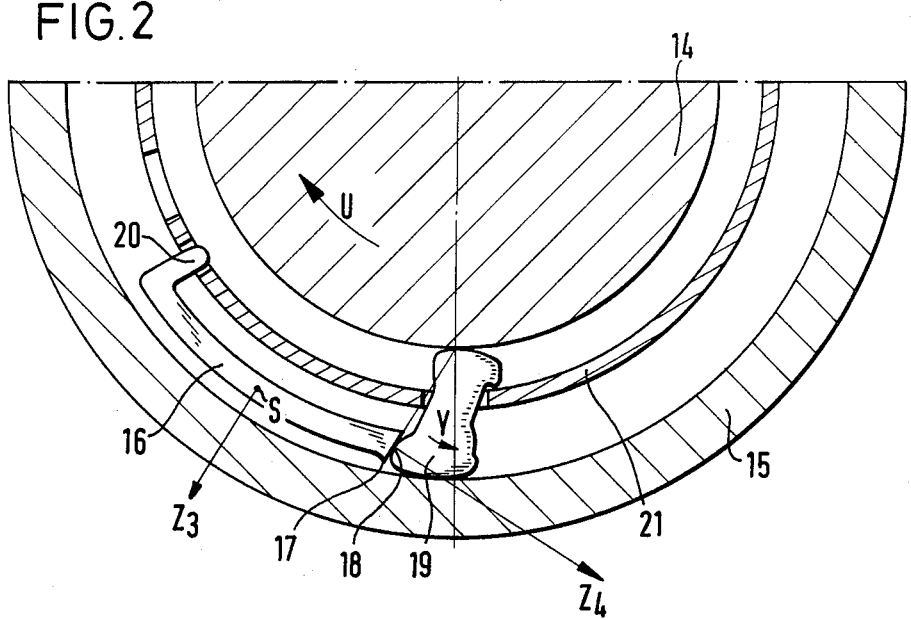
FIG. 2 is a partial transverse sectional view of another embodiment of the chucking apparatus of the present invention.

Referring now to FIG. 2, an embodiment of the chucking apparatus of the present invention is illustrated which is adapted for use in connection with a driving member 14 comprising a mandrel and a rotated member 15 comprising a hollow, cylindrical member. A cylindrical cage member 21 is concentrically located over driving member 14 and is fixed thereto for rotation therewith. Clamping bodies 19 (only one shown) are freely disposed in apertures formed in the cage member 21. A lever member 16 is located in the space defined between cage member 21 and rotated member 15 and has its rear end pivotally connected to cage member 21 at 20 while its front edge 17, which is wedge-shaped, abuts against the clamping body 19 at point 18. In this embodiment, upon the driving member 14 rotating in a direction indicated by arrow U, centrifugal force $Z_3$ acts at the center of gravity S of lever members 16. The centrifugal force $Z_3$ results in the front edge 17 of lever member 16 exerting a pushing force $Z_4$ on clamping body 19 which tends to supplement the clamping force normally exerted on the inner surface of rotated member 15 by clamping body 19. The pushing force $Z_4$ comprises a component of centrifugal force $Z_3$ which has a direction normal to the engaging surfaces 18 of lever member 16 and clamping body 19. Thus, lever member 16 increases the engaging force of clamping bodies 19 on rotated member 15. Additionally, by virtue of the pivoted engagement 20 of the rear end of lever member 16 to cage member 21, the clamping body 19 is positively braced in the position shown. Thus, as in the case of the embodiments shown in FIG. 1, the apparatus of the present invention supplements the normal force with which clamping bodies 19 engage rotated member 15 while further providing a positive bracing action for the clamping bodies which further assures that slippage does not occur during operation.

Figure 4:
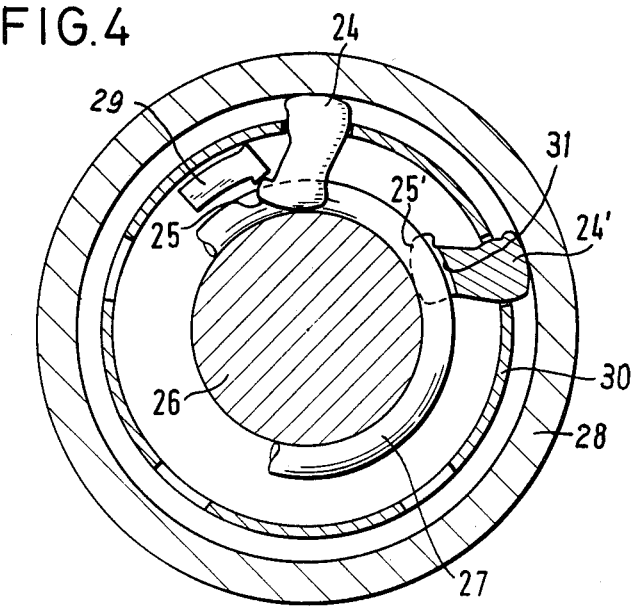
FIG. 4 is a partial transverse sectional view of yet another embodiment of the chucking apparatus of the present invention.
Figure 5:
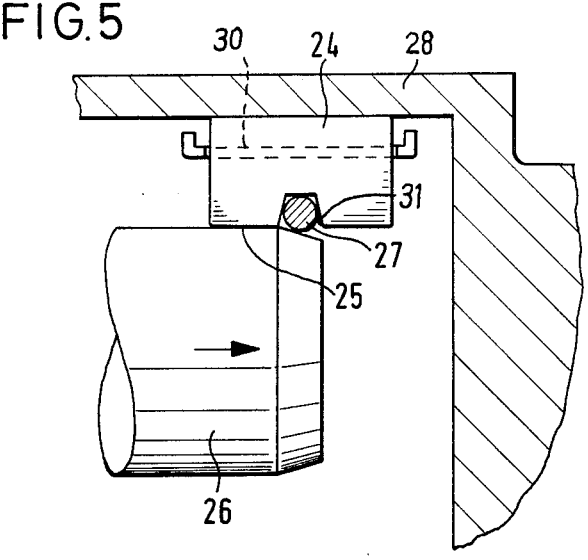
FIG. 5 is a partial longitudinal sectional view of the embodiment of the chucking apparatus illustrated in FIG. 4.

Referring now to FIGS. 4 and 5, another embodiment of the present invention is illustrated which corresponds to the embodiment of FIGS. 1 and 3 in that a cylindrical hollow driving member 28 has a solid cylindrical rotated member 26 fixed for rotation therein by means of a chucking apparatus comprising a cage member 30, clamping bodies 24,24' located in apertures formed in cage member 30 and a centrifugally activated lever member, schematically illustrated at 29. In this embodiment, an elastic ring 27 is disposed within grooves 31 formed in the bearing surfaces 25,25' of the clamping bodies 24,24', respectively. The shaft of the rotated member 26 is disposed within elastic ring 27 which is pre-stressed so that elastic ring 27 exerts a compressive holding force on rotated member 26 which prevents the latter from inadvertantly falling or becoming loose from the driving member 28 prior or subsequent to rotation thereof.

Obviously, numerous modifications and variations of the invention are possible in the light of the above teaching. It is therefore understood that within the scope of the appended claims the invention may be practiced otherwise then as specifically described herein.

What is claimed is:

1. Chucking apparatus for fixing a member to be rotated to a rotatable driving member, comprising:
   a cage member having at least one aperture formed therein and adapted to be mounted concentrically with respect to and for rotation with said driving member;
   at least one clamping body freely movably mouted without pre-stressing within said aperture formed in said cage member, said clamping body having a first bearing surface adapted to engage the member to be rotated during rotation of said driving member and associated cage member; and
   at least one lever member mounted for rotation with said driving and cage members, said lever member having a pair of end portions in engagement with said clamping body and said cage member respectively,
   said lever member having a third portion which is urged outwardly with respect to the center of rotation of said driving member under the action of centrifugal force which, in turn, causes said lever member end portion which is in engagement with said clamping body to exert a force thereon having at least a component in the direction of the force which said clamping body exerts on the rotated member, said lever member positively bracing said clamping body in engagement with the rotated member.

2. Chucking apparatus for fixing a member to be rotated to a rotatable driving member, comprising:
   a cage member having at least one aperture formed therein and adapted to be mounted concentrically with respect to and for rotation with said driving member;
   at least one clamping body freely movably mounted within said aperture formed in said cage member, said clamping body having a first bearing surface adapted to engage the member to be rotated during rotation of said driving member and associated cage member and a second surface engaging said driving member during rotation; and
   at least one lever member mounted for rotation within said driving and cage members, said lever member haivng a pair of end portions in engagement with said clamping body and said cage member respectively,
   said lever member having a portion which is urged outwardly with respect to the center of rotation of said driving member under the action of centrifugal force which, in turn, causes said lever member end portion which is in engagement with said clamping body to exert a force thereon which supplements the force which said clamping body exerts on the rotated member, said lever member positively bracing said clamping body in engagement with the rotated member.

3. The combination of claim 1 wherein said driving member comprises a hollow cylindrical member and said cage member is mounted concentrically within said driving member and wherein said member to be rotated is adapted to be located concentrically within said cage member.

4. The combination of claim 3 wherein said lever member is located inwardly of said cage member.

5. The combination of claim 4 wherein said lever member comprises first and second arm portions, said first arm portion having end surfaces which abut said clamping body and said cage member.

6. The combination of claim 5 wherein said lever first arm portion abuts said clamping body defining a pivotal connection therebetween.

7. The combination of claim 3 further including an elastic ring concentrically disposed within said cage member extending in the vicinity of the first surface of said clamping body adapted to engage the member to be rotated, said elastic ring being located in a groove formed in said clamping body first surface.

8. The combination of claim 1 wherein said driving member comprises a cylindrical shaft member and said cage member is mounted concentrically outside said driving member and wherein said member to be rotated is adapted to be located concentrically outside of said cage member.

9. The combination of claim 8 wherein said lever member is located outwardly of said cage member.

10. The combination of claim 9 wherein said lever member is pivotally connected to said cage member.

* * * * *